United States Patent [19]

Jant et al.

[11] Patent Number: 4,654,096

[45] Date of Patent: Mar. 31, 1987

[54] METHOD OF MAKING A FLEXIBLE HOSE

[75] Inventors: Keith H. Jant, Columbia; Richard L. Billiet, Brentwood, both of Tenn.

[73] Assignee: Dana Corporation, Toledo, Ohio

[21] Appl. No.: 640,525

[22] Filed: Aug. 14, 1984

[51] Int. Cl.$^4$ ............................................. B65H 81/00
[52] U.S. Cl. ................................... 156/149; 156/171; 156/172; 156/195; 156/310
[58] Field of Search ........... 156/149, 156, 155, 244.13, 156/195, 310, 171; 138/123, 124, 125, 126, 127

[56] References Cited

U.S. PATENT DOCUMENTS

| | | |
|---|---|---|
| 1,973,756 | 9/1934 | Gish . |
| 2,652,093 | 9/1953 | Burton ................................. 156/149 |
| 3,026,223 | 3/1962 | Vanderbilt ......................... 156/18 X |
| 3,116,760 | 1/1964 | Matthews . |
| 3,383,258 | 5/1968 | Houlston ............................... 156/149 |
| 3,722,550 | 3/1973 | Matthews . |
| 3,944,453 | 3/1976 | Chudgar et al. . |
| 4,019,939 | 4/1977 | Barbier et al. ....................... 156/155 |
| 4,102,360 | 7/1978 | Hopkins .............................. 156/195 |
| 4,130,139 | 12/1978 | Haren . |
| 4,341,822 | 7/1982 | Singer et al. ........................ 156/166 |

FOREIGN PATENT DOCUMENTS 0704096  2/1954  United Kingdom ................ 156/125

Primary Examiner—Michael Ball
Attorney, Agent, or Firm—Robert M. Leonardi; Robert H. Johnson

[57] ABSTRACT

A flexible hose has a thermoplastic core tube, a reinforcing layer surrounding the core tube, an elastomeric sheath surrounding and bonded to the reinforcing layer, and a plastic fiber protection layer surrounding and adhering to the sheath. The hose can be made by applying a layer of viscous cement to the reinforcing layer applied around the core tube, wrapping the viscous cement layer, with an overlapping seam, with a calendered layer stock of elastomeric material, and applying an abrasion protection layer around the elastomeric material. The hose is self-curing at ambient temperature and can be made on conventional hose manufacturing equipment.

15 Claims, 5 Drawing Figures

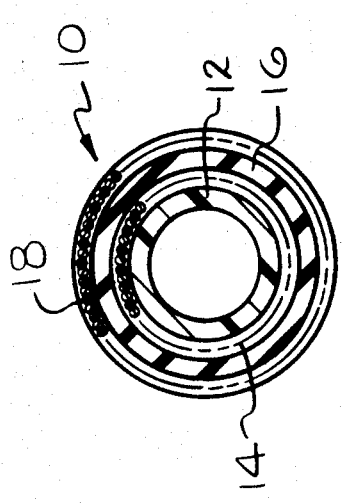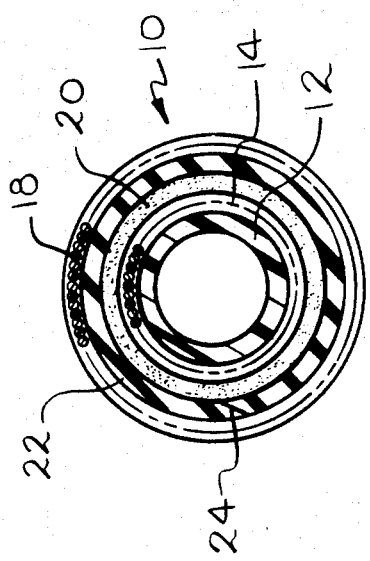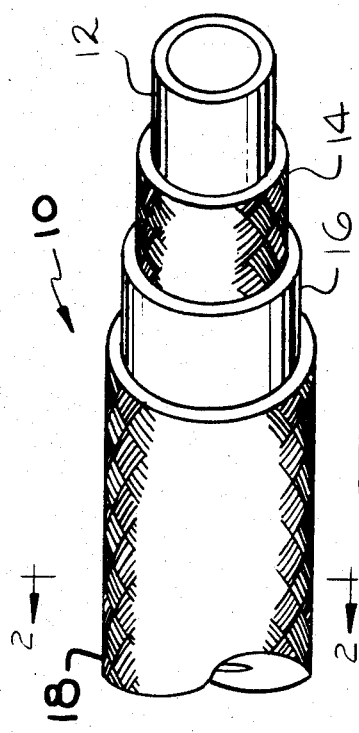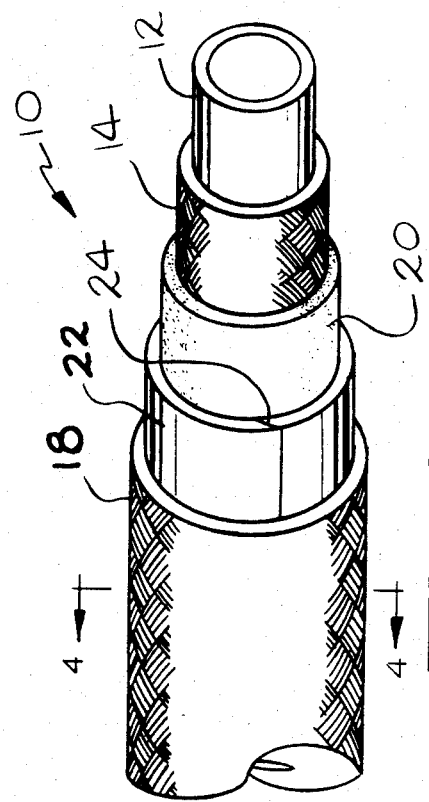

METHOD OF MAKING A FLEXIBLE HOSE

BACKGROUND OF THE INVENTION

This invention relates to flexible hoses and methods of making same, and more specifically to a composite reinforced polymeric hose made by an ambient or self-curing method.

Flexible hose, such as composite reinforced polymeric hose, has been used over many years to handle all types of pressurized fluids under many different conditions, including elevated temperature and pressure and severe impulse cycles.

Despite a long history of improvement in regard to such hose, we have developed an improved method of making such hose which, because of its ambient or self-curing feature, permits a reduction of manufacturing costs due to reduced energy consumption and reduced labor requirements while still using conventional hose manufacturing equipment.

BRIEF SUMMARY OF THE INVENTION

This invention relates to a hose construction having a core tube of thermoplastic surrounded by a tight wire braid which forms a reinforcing layer mechanically locked to the tube. Surrounding the reinforcing layer is an elastomeric sheath which is chemically bonded to the reinforcing layer. Finally, a braided plastic fiber surrounds and adheres to the sheath to form an abrasion protection layer.

The sequential steps in our method for making our hose includes providing a thermoplastic core tube which then is filled with water and frozen. Next, a wire braid is applied to the tube to form a reinforcing layer. A layer of viscous cement then is applied to the tube and calendared layer stock of elastomeric material is wrapped with an overlapping seam around the cement layer. Lastly, plastic fiber is braided over the elastomeric material to form an abrasion protection layer.

It is a principal object of our invention to provide an improved method of making hose which reduces the cost of manufacture.

The above and other objects, features and advantages of our invention will become apparent upon consideration of the detailed description and appended drawing.

BRIEF DESCRIPTION OF THE DRAWING

FIG. 1 is an isometric view of our improved hose, with portions of each layer of the hose removed, FIG. 2 is a cross-section taken along line 2—2 in FIG. 1, FIG. 3 is similar to FIG. 1, except the hose is not yet cured, FIG. 4 is a cross-section taken along line 4—4 in FIG. 3.

DETAILED DESCRIPTION OF THE PREFERRED EMBODIMENT

Figure 5:
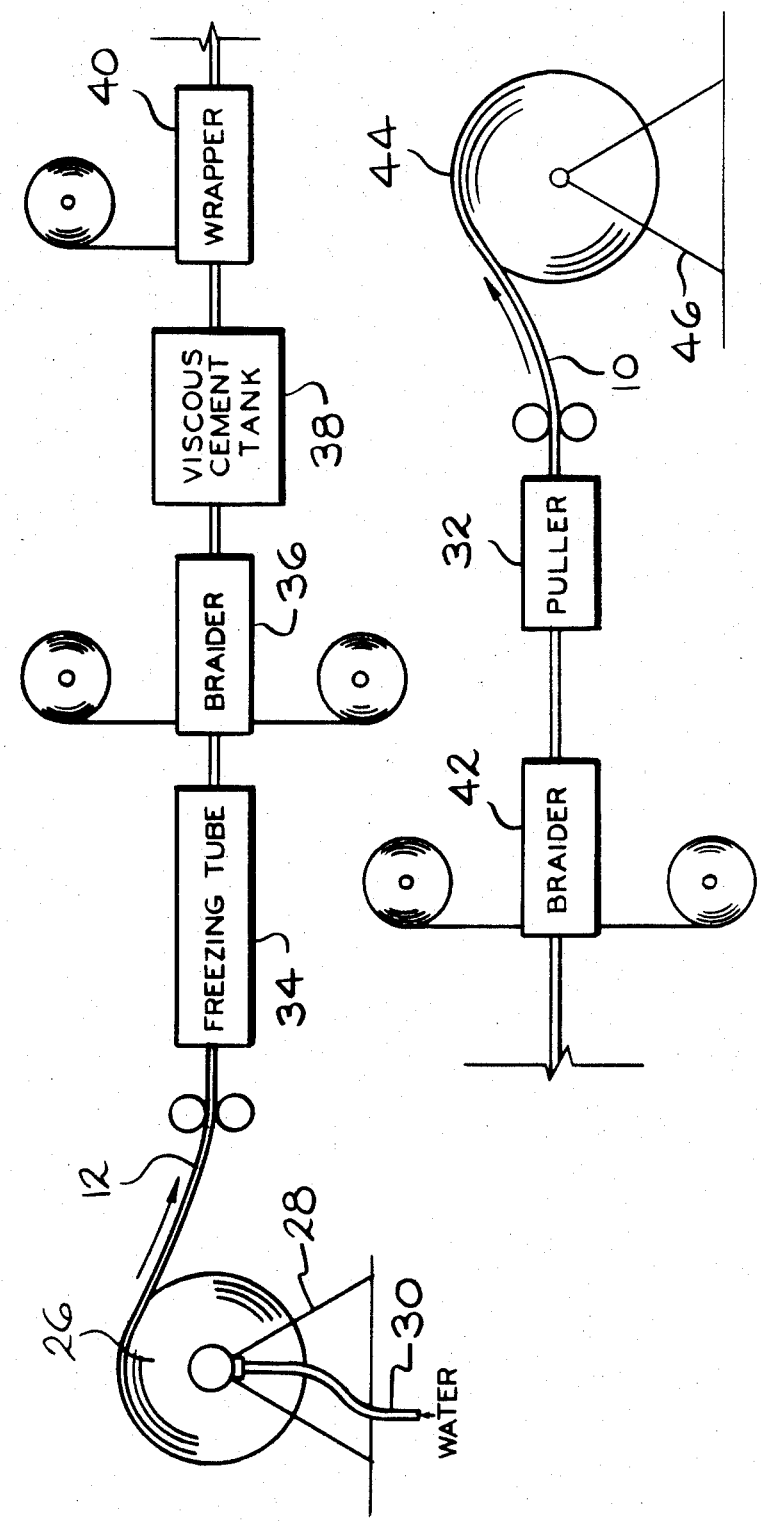
FIG. 5 is a schematic showing a manufacturing line for making hose according to our improved method.

Referring to FIGS. 1 and 2, reference numeral 10 denotes the hose made by our improved method. Hose 10 which is shown in FIGS. 1 and 2 is fully cured and, as can be seen by referring specifically to FIG. 1, includes a plurality of layers. Hose 10 includes a seamless elastomeric core tube 12 which can be any thermoplastic, depending upon fluid compatability requirements of the hose. The thermoplastic, for example, can be a polyester, such as Hytrel 5556 manufactured by DuPont, or a polyamide, such as Nylon 11 manufactured by DuPont.

Surrounding tube 12 is a reinforcing layer 14. Preferably, reinforcing layer 14 is braided wire which, for example, can be brass coated steel or stainless steel. In lieu of wire a suitable plastic fiber can be used.

Surrounding reinforcing layer 14 is an elastomeric sheath 16 which is approximately 0.012 inches (0.305 mm) thick and serves primarily to protect the wire used in reinforcing layer 14 from corrosion. Elastomeric sheath 16 preferably is a thermoset compound having polychloroprene as the base polymer.

Surrounding elastomeric sheath 16 is an abrasion protection layer 18 which preferably is a braided plastic fiber, such as a polyester.

Turning now to FIGS. 3 and 4, the construction of hose 10 in its uncured state will be described. It will be understood that this hose is self-curing under ambient conditions. That is, after the hose is made on the production line, another 24 to 48 hours is required for the hose to cure under ambient conditions. Shortly after hose 10 is removed from the production line it has the construction shown in FIGS. 3 and 4, but as curing of hose 10 progresses the construcion will change to that described previously and shown in FIGS. 1 and 2. The construction of hose 10 in its uncured state essentially is the same as the hose construction in the cured state. That is, the uncured state of hose 10 includes the core tube 12, the reinforcing layer 14 and the abrasion protection layer 18. The difference is that surrounding reinforcing layer 14 is a layer approximately 0.005 inches (0.127 mm) thick of viscous cement 20 which comprises a standard thermoset compound swelled with a solvent and mixed with an adhesion promoter and cross-linking agent. In this regard we prefer to use a thermoset compound having polychloroprene as the base polymer which is swelled with toluene and mixed with methylene bis(4-phenyl isocyanate).

Wrapped around the layer of viscous cement 20 is a layer of calendared stock 22 which preferably is a thermoset compound having polychloroprene as the base polymer and may be the same as or closely similar to the thermoset compound used in viscous cement 20. It will be noted that calendared stock 22 is wrapped around viscous cement 20 with an overlapping seam 24 which extends longitudinally along hose 10, although stock 22 could be wrapped with an overlapping seam which spirals around hose 10.

Referring now to FIG. 5, the method of our invention will be described. A reel 26 containing a length of core tube 12 is mounted for rotation on a reel stand 28 and the inner end of core tube 12 is connected through a rotating coupling to a source of pressurized water 30. Core tube 12 is filled with water from source 30 and then the outer end of core tube 12 is closed. After this is accomplished, the water filled core tube is pulled through a series of operating stations in a production line by a puller or pulling machine 32.

After tube 12 is filled with water it passes through a freezing tube 34 so that both tube 12 and the water contained therein is frozen with tube 12 being substantially straight longitudinally. (The steps of filling tube 12 with water and then freezng tube 12 and the water is a means of supporting tube 12 through the remaining steps of the method.) The water filled frozen tube 12 next passes through a braider 36 which applies a braided wire reinforcing layer 14 (see FIGS. 1-4) around tube 12 which is sufficiently tight enough to mechanically lock reinforcing layer 14 to tube 12. From braider 36 tube 12 now carrying reinforcing layer 14, passes through a tank 38 which is filled with viscous cement 20 so that a layer of viscous cement is applied over reinforcing layer 14 (see FIGS. 3 and 4). From tank 38 tube 12 passes through a wrapper 40 which wraps a layer of calendared stock 22 (see FIGS. 3 and 4) of thermoset compound around the layer of viscous cement 20. The layer of calendared stock 22 is wrapped so that there is an overlapping seam 24 that extends longitudinally of tube 12, as best seen in FIG. 3. From wrapper 40 tube 12 passes through a second braider 42 which applies a braid of plastic fiber around calendared stock 22 to form abrasion protection layer 18. The completed, but as yet uncured, hose 10 now passes through puller 32 and is taken up on a driven reel 44 mounted on a reel stand 46. The uncured hose 10 then is stored on reel 44 at ambient conditions and will cure in approximately 24 to 48 hours.

During the curing process it appears that the solvent and the adhesion promoter and crosslinking agent contained in viscous cement 20 migrate outwardly through the layer of calendared stock 22 so that over the course of 24 to 48 hours the demarkation between viscous cement 20 and calendared stock 22 disappears and an elastomeric sheath 16 (FIGS. 1 and 2) is formed which is chemically bonded to reinforcing layer 14 and adheres to abrasion protection layer 18. Also, the layer of calendared stock 22 of thermoset compound is completely crosslinked or cured as is the thermoset compound in viscous cement 20.

While only a single embodiment of our invention has been described, it will be understood that various modifications can be made to our invention without departing from the spirit and scope of it.

We claim:

1. A method of forming a hose, said hose comprising a flexible core tube, a reinforcing layer around said tube, and an elastomeric sheath around said reinforcing layer, said method comprising forming said elastomeric sheath by compounding an uncured thermoset elastomeric material from a base polymer, forming an ambient curing viscous cement by mixing said base polymer with a solvent and an adhesion promoter and cross-linking agent, applying a layer of said ambient curing viscous cement to said reinforcing layer, wrapping a layer of said uncured thermoset elastomeric material around said layer of viscous cement, and allowing the uncured thermoset elastomeric material to cure under ambient conditions by migration of the viscous cement through the elastomeric material.

2. A method of forming a hose as defined in claim 1 further comprising the step of applying an abrasion protection layer around said layers of viscous cement and uncured thermoset elastomeric material prior to allowing said uncured thermoset elastomeric material to cure, wherein said elastomeric sheath becomes bonded to said abrasion protection layer and to said reinforcing layer.

3. A method as set forth in claim 1 wherein the viscous cement comprises polychloroprene as a base polymer.

4. A method as set forth in claim 3 wherein the elastomeric layer has polychloroprene as a base polymer.

5. A method as set forth in claim 1 wherein the total thickness of the elastomeric material after curing is approximately 0.012 inches.

6. A method of forming a hose, said method comprising the steps of:
providing a flexible core tube,
applying a reinforcing layer around said tube,
compounding an uncured thermoset elastomeric material from a base polymer,
forming an ambient curing viscous cement by mixing said base polymer with a solvent and an adhesion promoter and cross-linking agent,
applying a layer of said ambient curing viscous cement to said reinforcing layer,
wrapping a layer of said uncured thermoset elastomeric material around said layer of viscous cement,
applying an abrasion protection layer around said elastomeric material, and
allowing the thermoset elastomeric material to cure under ambient conditions by migration of the viscous cement through the elastomeric material.

7. The method as set forth in claim 6 wherein the adhesion promoter and cross-linking agent migrates outwardly through the elastomeric material to form an elastomeric sheath chemically bonded to the reinforcing layer and to the abrasion protection layer.

8. The method as set forth in claim 7 wherein said elastomeric material is a thermoset compound having polychloroprene as a base polymer.

9. The method as set forth on claim 8 wherein said elastomeric material is wrapped around said layer of viscous cement with an overlapping seam.

10. The method as set forth in claim 8 wherein said adhesion promoter and cross-linking agent is methylene bis(4-phenyl isocyanate).

11. The method as set forth in claim 10 wherein said solvent is toluene.

12. The method as set forth in claim 11 wherein said reinforcing layer is braided wire and wherein said braid is applied tightly enough so that said viscous cement is prevented from reaching said tube.

13. The method as set forth in claim 12 wherein the reinforcing layer is brass coated steel wire.

14. The method as set forth in claim 13 wherein the abrasion protection layer is braided polyester.

15. The method as set forth in claim 6 wherein said hose is allowed to cure under ambient conditions for approximately 24 to 48 hours.

* * * * *